United States Patent
Uan-Zo-Li et al.

(10) Patent No.: US 9,541,991 B2
(45) Date of Patent: Jan. 10, 2017

(54) METHOD AND APPARATUS FOR MANAGING COMPUTING SYSTEM POWER

(71) Applicant: INTEL CORPORATION, Santa Clara, CA (US)

(72) Inventors: Alexander B. Uan-Zo-Li, Hillsboro, OR (US); Jorge P. Rodriguez, Portland, OR (US); Philip R. Lehwalder, Hillsboro, OR (US); Patrick K. Leung, Hillsboro, OR (US); James G. Hermerding, II, San Jose, CA (US); Vasudevan Srinivasan, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 682 days.

(21) Appl. No.: 13/715,810

(22) Filed: Dec. 14, 2012

(65) Prior Publication Data

US 2014/0173305 A1   Jun. 19, 2014

(51) Int. Cl.
*G06F 1/32* (2006.01)
*G06F 1/28* (2006.01)

(52) U.S. Cl.
CPC ............ *G06F 1/3296* (2013.01); *G06F 1/28* (2013.01); *G06F 1/3212* (2013.01); *Y02B 60/1285* (2013.01); *Y02B 60/1292* (2013.01)

(58) Field of Classification Search
CPC .............. G06F 1/00; G06F 1/04; G06F 1/12; G06F 1/26; G06F 1/32; G06F 11/30; G06F 15/16
See application file for complete search history.

(56) References Cited

U.S. PATENT DOCUMENTS

| | | | |
|---|---|---|---|
| 4,935,691 A * | 6/1990 | Lamar | G05F 1/455 323/237 |
| 6,625,741 B1 * | 9/2003 | Post et al. | 713/340 |
| 2002/0171398 A1 * | 11/2002 | Odaohhara | 320/128 |
| 2003/0188210 A1 * | 10/2003 | Nakazato | 713/320 |
| 2005/0007089 A1 | 1/2005 | Niiyama et al. | |
| 2006/0076932 A1 | 4/2006 | Roh | |
| 2008/0059820 A1 * | 3/2008 | Vaden et al. | 713/320 |
| 2008/0088998 A1 | 4/2008 | So | |
| 2009/0172426 A1 * | 7/2009 | Huang et al. | 713/300 |
| 2009/0193277 A1 * | 7/2009 | Chueh et al. | 713/340 |
| 2009/0296287 A1 * | 12/2009 | Wang et al. | 361/18 |
| 2010/0026224 A1 * | 2/2010 | Kollner | H02H 7/0851 318/432 |

(Continued)

FOREIGN PATENT DOCUMENTS

KR   10-2000-0025208   5/2000

OTHER PUBLICATIONS

International Search Report and Written Opinion received for PCT Patent Application PCT/US2013/074092, mailed Oct. 14, 2014, 14 pages.

*Primary Examiner* — Thomas Lee
*Assistant Examiner* — Mohammad A Rahman

(57) ABSTRACT

An apparatus may include first circuitry coupled to one or more platform components, the first circuitry operative to receive an unfiltered input voltage signal, compare a first voltage level of the unfiltered input voltage signal to a first reference voltage level, and generate a control signal operative to lower operation power of one or more of the one or more platform components when the first voltage level is less than the first reference voltage level.

23 Claims, 9 Drawing Sheets

(56) References Cited

U.S. PATENT DOCUMENTS

| | | | |
|---|---|---|---|
| 2010/0229021 A1* | 9/2010 | Konstadinidis | G06F 1/08 713/601 |
| 2011/0239010 A1* | 9/2011 | Jain et al. | 713/310 |
| 2012/0062192 A1* | 3/2012 | Okuma | 323/272 |
| 2013/0003805 A1* | 1/2013 | Zeng et al. | 375/224 |
| 2013/0138984 A1* | 5/2013 | Wortham | G06F 1/26 713/320 |
| 2014/0215238 A1* | 7/2014 | Rider | 713/320 |

* cited by examiner

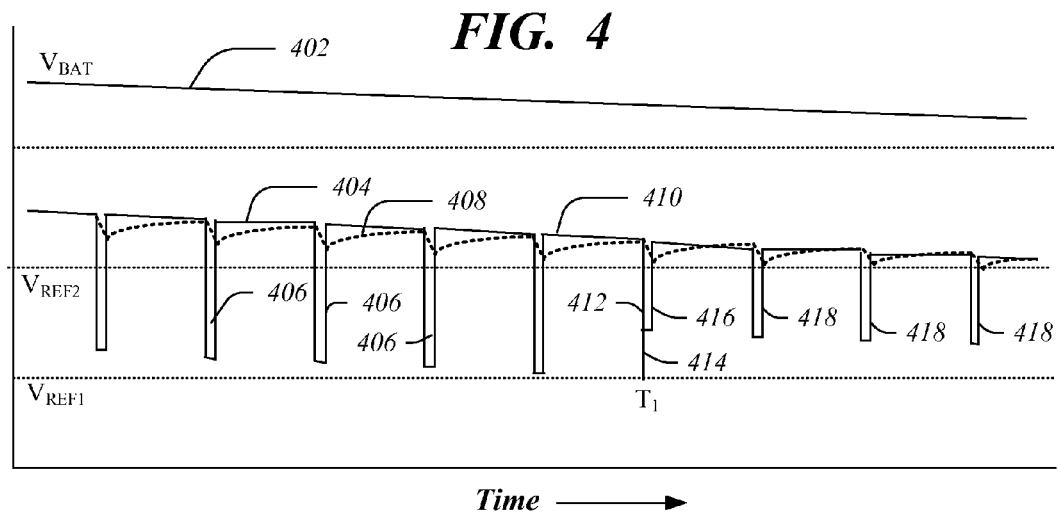
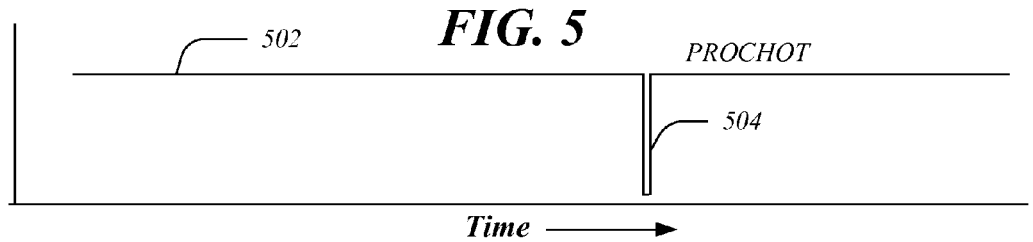
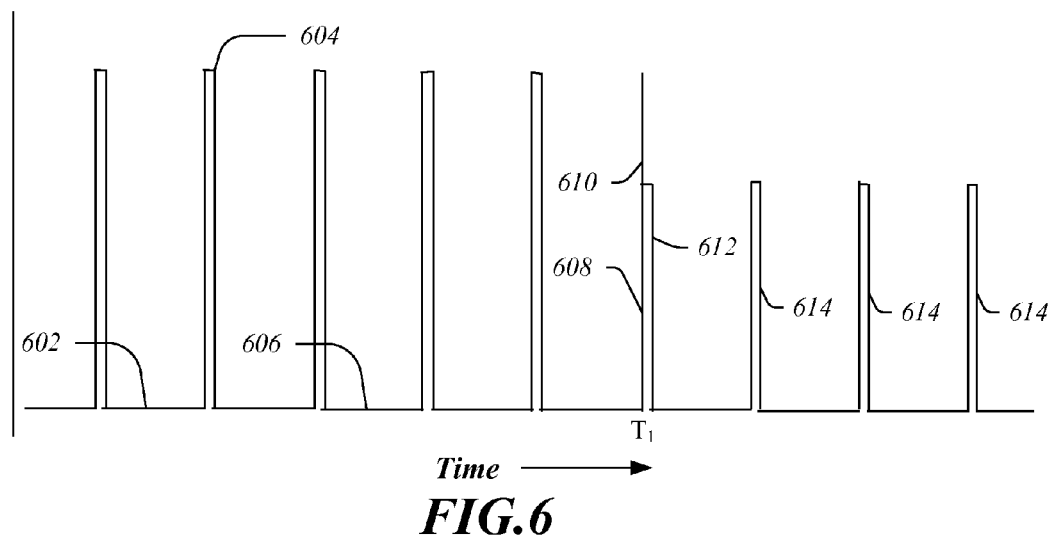

METHOD AND APPARATUS FOR MANAGING COMPUTING SYSTEM POWER

BACKGROUND

In present day and future portable computing systems (platforms) and portable communications systems, battery design plays an important role for optimizing performance as well as in ergonomic issues such as portability. In some designs, for example, battery configurations may involve only two battery cells arranged in series, which entails a lower input voltage for the platform to be powered by the battery.

The lower input voltage provided to a given computing/communications platform by a battery such as a two battery cell configuration places restrictions on the central processing unit (CPU) device performance in a portable device when the portable device is powered by the battery. For example, if a CPU is operating in an enhanced operation mode, such as a so called "Dynamic Turbo" mode, and battery cells discharge, the system voltage may droop below a minimum voltage required by the platform power delivery.

In one example of operation of known computing platforms, one or more 5V voltage regulators (VRs) may be designed so that proper operation requires a minimum input voltage to the VR of between 5.2 V and 6 V. During operation, the individual or collective activity of one or more devices in a mobile computing/communications platform may cause a large power spike, including for example, the action of a processor such as a CPU when operating in a Dynamic Turbo mode. Assuming that a total resistance from the battery cells (including the internal cell resistance) to the input of a 5V regulator is equal to 100 mOhm, and a minimum input 5V VR voltage of 5.6V, the battery cell voltage of 3.5V—above the traditional cut-off voltage of the cells. To account for such circumstances, a conservative system design would require the mobile computing system to drastically lower the CPU maximum current ($I_{max}$) and performance when the battery cells are a voltage level of 3.5V—which may severely restrict usage of the mobile computing platform for end-users. Such system design takes into account maximum projected power consumption, which may take place in real operation of the mobile computing platform only under rare circumstances if at all. Accordingly, system performance of a mobile computing system powered by a lower voltage battery design may be sacrificed in order to accommodate unlikely operation scenarios.

It is with respect to these and other considerations that the present improvements have been needed.

BRIEF DESCRIPTION OF THE DRAWINGS

FIG. 4 details the behavior of various voltage signals in one exemplary scenario.

FIG. 5 depicts the signal level for an exemplary control signal that may result from the scenario of FIG. 4.

FIG. 6 depicts an example of current operation for a platform component consistent with the scenario of FIGS. 4 and 5.

DETAILED DESCRIPTION

Various embodiments are related to managing platform power in devices, including portable computing devices, portable communications devices, and other portable electronics devices. In various embodiments, apparatus and techniques are provided that better manage voltage levels provided to a platform. In particular, the present embodiments address the problem of voltage droop that may occur during operation of a device, such as during battery powered operation when the voltage may approach or breach voltage levels that may otherwise threaten shutdown of the device.

In accordance with some embodiments, the system input voltage is monitored such that the maximum operating power may be limited when the system input voltage approaches or breaches a voltage limit.

Various embodiments may comprise one or more elements. An element may comprise any structure arranged to perform certain operations. Some elements may be implemented as hardware, firmware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
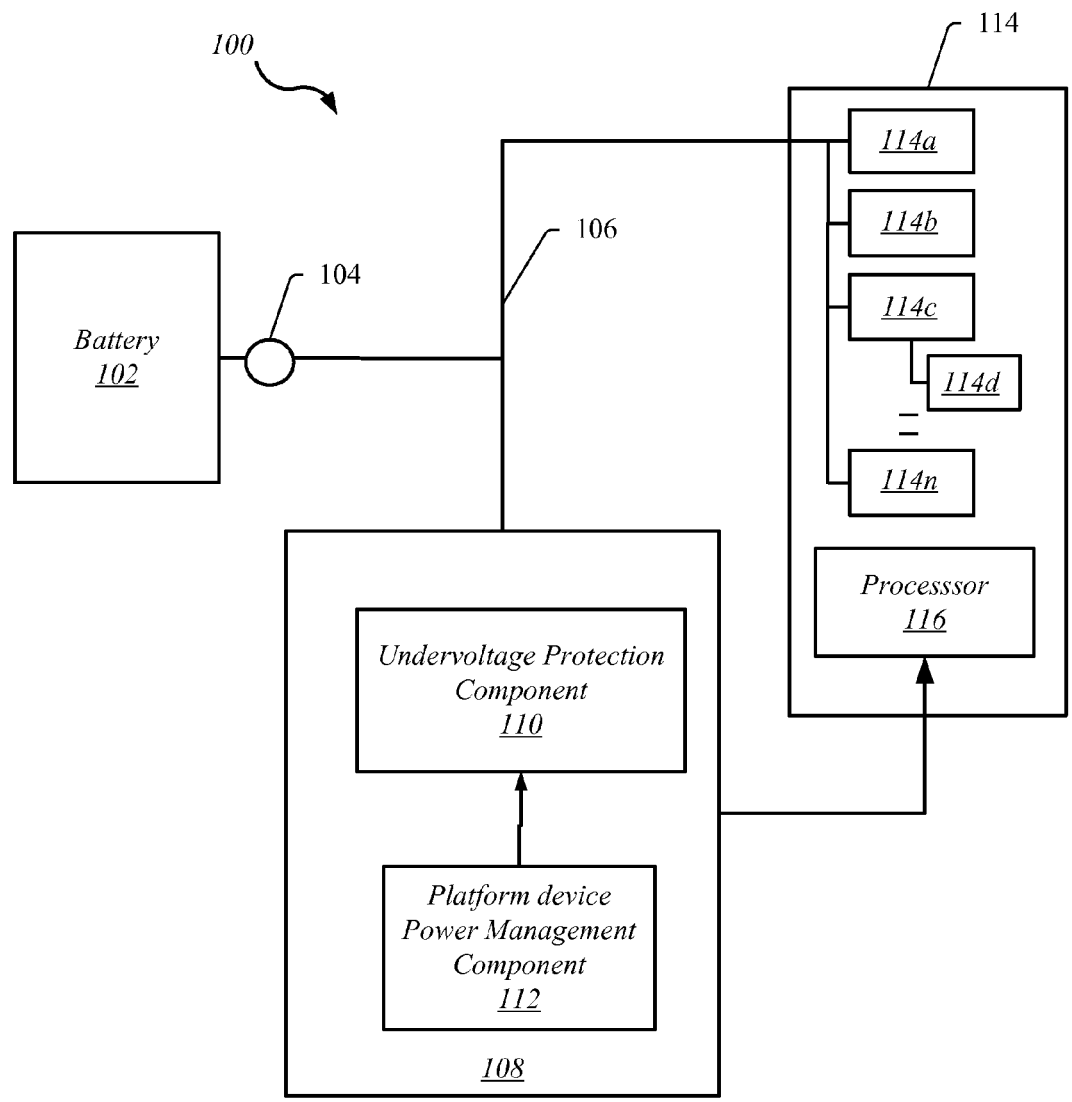
FIG. 1 depicts one embodiment of a portable system.

FIG. 1 depicts one embodiment of a portable device or portable system 100. The portable system 100 may include a battery 102 that supplies power through a system voltage input node 104 to platform components 114 (shown individually as components 114a to 114n, where a, b, c, d, and n represent any non-zero integer). The system voltage input node 104 may be coupled to an input line that supplies power from an external source (not shown) such as external AC power. In various modes, the system 100 may operate while coupled to an AC power source or may operate while entirely powered by the battery 102, for example, if the system is unattached to any external power source.

Platform components 114 may include one or more voltage regulators that are designed to operate within a specific input voltage tolerance or range. Accordingly, if the system input voltage 106 is below the input voltage range, the system 100 may not function properly or may shutdown. As noted above, modern processor design allows for high power ("turbo"). The power excursions during the turbo mode may result in system voltage droop, including for short periods in which power consumption may cause a concomitant drop in input voltage to below safe operating levels, even if the time average input voltage is above a lower limit for safe operation of system of the platform components 114.

Even without operation in such turbo modes, the processor power may increase due to increased workload and such voltage droop may occur. In one example, a processor 116, as well as other platform components, may be operative to adjust its mode to a high power mode for short periods of time in order to provide enhanced performance. These periods may last from several milliseconds to tens of milliseconds and may take place occasionally, such as at intervals of hundreds of milliseconds or seconds. In this manner, the platform device(s) may operate at a regular power level, or regular operating mode, for a majority of the time, while operating in high power modes for short durations. Depending upon the magnitude of the power increase in a high power mode, the system input voltage 106 may droop below an acceptable level. Moreover, when the system 100 is powered only by the battery 102, the voltage level supplied by battery 102 may gradually decrease, thereby lowering the average system input voltage 106 with time and increasing the likelihood that a voltage droop induced by high power operation results in an unacceptably low system input voltage 106.

To address this issue, system 100 includes a platform protection system 108 that is operative to monitor the system input voltage 106 and respond in order to limit voltage excursions below safe operating levels. In various embodiments, the platform protection system 108 includes an undervoltage protection component 110 and a platform device power management component 112, each of which may be embodied in hardware, or a combination of hardware and software, examples of which are set forth below.

Figure 2:
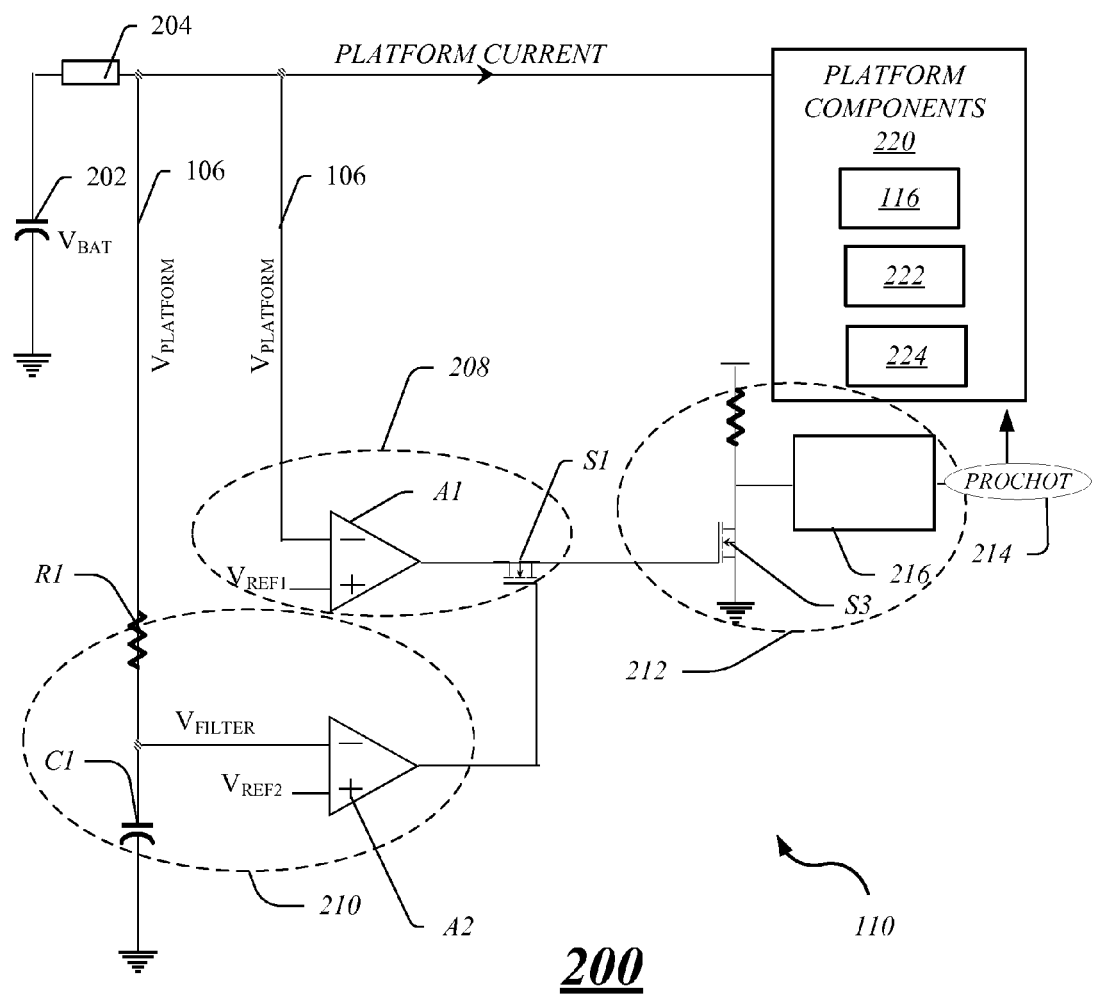
FIG. 2 depicts one exemplary arrangement for undervoltage protection.

FIG. 2 illustrates one exemplary arrangement 200 that provides undervoltage protection. In the example shown, the battery 202 outputs a voltage $V_{BAT}$, which is reduced by total resistance 204 (which includes cell resistance, battery resistance, and platform resistance), resulting in a platform current to drive the platform components 220 at the system input voltage 106 (which is labeled as $V_{PLATFORM}$). In the arrangement of FIG. 2, the undervoltage protection component 110 is embodied in several circuits 208, 210, 212, which are interoperable to generate a control signal 214 that may be directed to one or more components of the platform components 220. In particular embodiments, the undervoltage protection component 110 may be arranged to detect an undervoltage condition and to generate in response a PROCHOT# signal that may cause one or more of the platform components 220 to adjust their operation in order to consume less power. In the example of FIG. 2, the platform components 220 whose power consumption may be adjusted downwardly in response to the control signal 214 may include, among other possible components, the aforementioned processor 116, a graphics processor 222, and/or a memory device 224. The platform components 220 may further include such elements as display components (not shown) and charger components (also not shown). The embodiments are not limited in this context. By lowering the amount of power consumed by one or more platform components 220, the undervoltage condition may be alleviated thereby preventing a more severe consequence such as an entire system shutdown.

In embodiments in which the control signal 214 is a PROCHOT# signal, the control signal 214 may be asserted over a PROCHOT# pin. The PROCHOT# pin is a type of package pin that is typically employed in known systems to carry information concerning the thermal condition of components, such as one or more of the platform components 220. In conventional use, if any processor core reaches a temperature higher than a predetermined threshold, the PROCHOT# will assert. This triggers a thermal control circuit to become active and remain active until the thermal breach ends, after which PROCHOT# deasserts. Accordingly, in the present embodiments, a PROCHOT# pin may be employed to convey both control signals to avoid system undervoltage as well as control signals to respond to overheating of platform components.

As illustrated in FIG. 2 the system input voltage 106 is connected in parallel to the circuit 208 and to the circuit 210. The system input voltage 106 may arrive at each circuit 208, 210 as an unfiltered voltage signal. The circuit 208 is arranged to generate a signal that triggers the sending of the control signal 214 when the system input voltage 106 drops below a predetermined value. As shown in FIG. 2 the circuit 208 includes a comparator A1 and transistor S1 coupled to the output of comparator A1. The system input voltage 106 is coupled to one input of the comparator A1, and a reference voltage $V_{REF1}$ is coupled to the other input. When $V_{REF1}$ exceeds the system input voltage 106, a signal is output from the comparator A1 that is conducted to the transistor S1. Depending upon the state of transistor S1, the output signal may be conducted through the transistor S3 of circuit 212, thereby triggering the device 216 to assert PROCHOT#.

As further shown in FIG. 2, the system input voltage 106 is arranged to flow through the circuit 210, which includes resistor R1 and capacitor C1. The resistor R1 and capacitor C1 are operative to filter an input voltage signal, thereby reducing the amplitude of or eliminating transient (short duration) voltage excursions, as detailed below. The filtered system input voltage $V_{FILTER}$ arrives at one input of the comparator A2, while the other input is operative to receive a second reference voltage $V_{REF2}$. As shown in FIG. 2, if the value of $V_{FILTER}$ exceeds the second reference voltage $V_{REF2}$ a signal is output by the comparator A2 to open the gate of transistor S1 and thereby pass the signal generated from the circuit 208 to trigger the control signal 214. In various embodiments $V_{REF2}$ may be higher or lower than $V_{REF1}$. In this manner, and as detailed below, the undervoltage protection component 110 is operative to output a control signal 214 to reduce platform power when a voltage droop resulting from a current excursion causes the unfiltered system input voltage to reduce below a first reference voltage, and when the filtered voltage, which may filter out the voltage droop, remains above a second threshold. Advantages of this arrangement are detailed in particular with respect to FIGS. 4 to 10 to follow.

Figure 3:
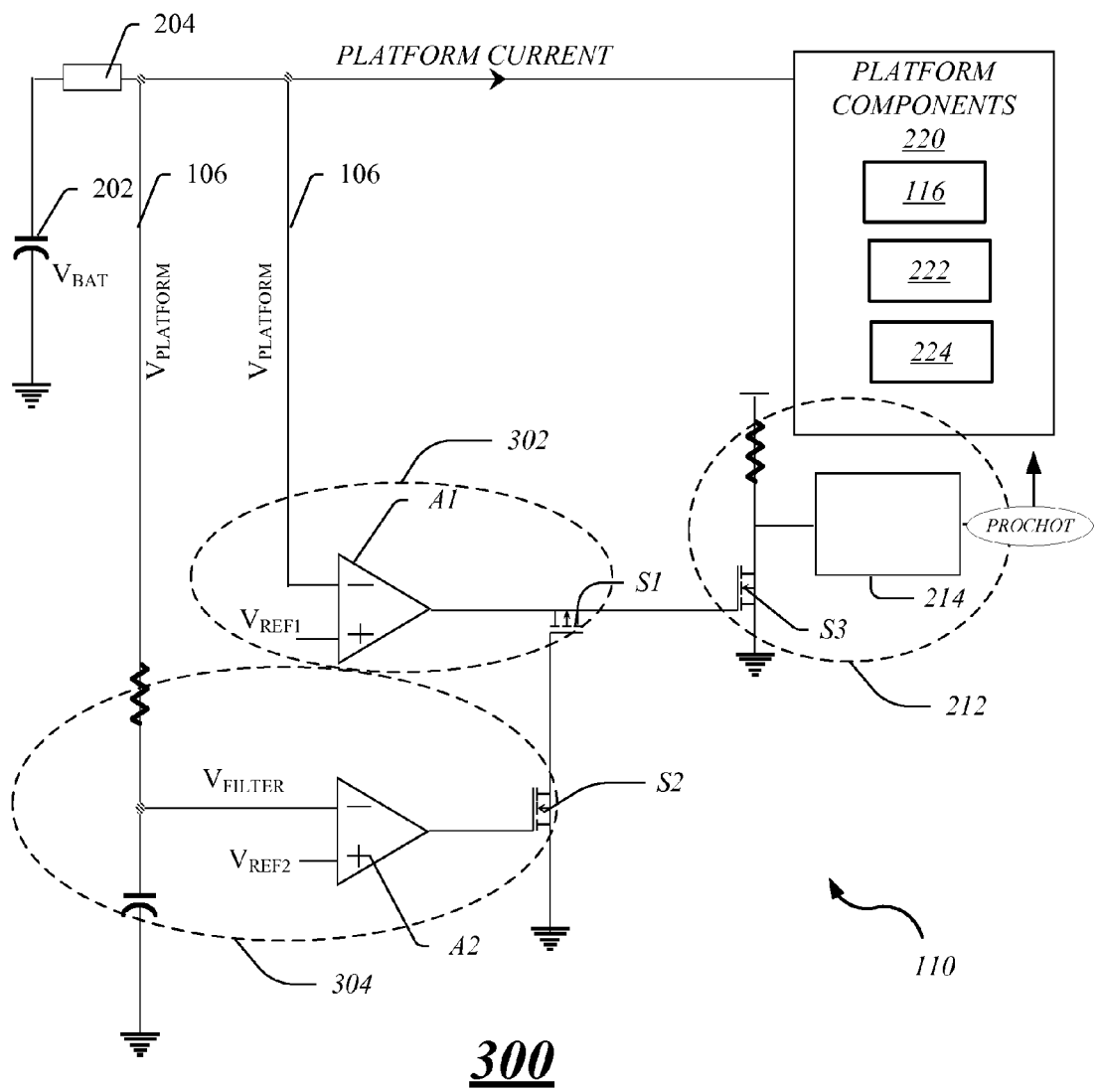
FIG. 3 depicts another exemplary arrangement for undervoltage protection.

FIG. 3 illustrates another exemplary arrangement 300 that provides undervoltage protection and may be considered as a variant of the arrangement 200 of FIG. 2. As shown in FIG. 3, the arrangement 300 provides a different embodiment of the undervoltage protection component 110. In this embodiment, in addition to the circuit 212, the undervoltage protection component 110 includes a circuit 302 and additional circuit 304. The circuit 302 is operative similarly to circuit 208 to output a signal from the comparator A1 when the system input voltage 106 that is fed to a first input exceeds the reference voltage $V_{REF1}$ Moreover, similarly to the function of the circuit 210, the circuit 304 is arranged to allow the signal output from the circuit 302 to trigger the assertion of the control signal 214 when the filtered system input voltage $V_{REF1}$ exceeds the second reference voltage $V_{REF1}$.

In this latter embodiment, the circuit 304 includes a transistor whose gate is coupled to receive a signal output from the comparator A2. In this case, the voltage level of the signal output from comparator A2 when the filtered system input voltage $V_{FILTER}$ exceeds the second reference voltage $V_{REF2}$ may cause the gate of transistor S2 to turn on the transistor S2, thereby bringing the voltage level of the gate of transistor S1 to a level sufficient to pass the output signal of comparator A2 to the circuit 212. Accordingly, this embodiment of the undervoltage protection component 110 is also operative to output a control signal 214 to reduce platform power when a voltage droop resulting from a current excursion causes the unfiltered system input voltage to reduce below a first reference voltage, and when the filtered voltage remains above a second threshold. As will be readily appreciated by those of skill in the art, the present embodiments are not limited to the specific arrangement of the examples shown in FIGS. 2 and 3, since other circuits may be readily envisioned that act in a similar fashion to manage the assertion of a control signal via the use of an unfiltered and filtered input voltage signal.

FIG. 4 details the behavior of various voltage signals in one operation scenario that highlights operation of the present embodiments. In the top portion of FIG. 4 there is shown a curve representing system battery voltage ($V_{BAT}$) 402 as a function of time. In this scenario, the system, such as system 100, may be uncoupled from an external AC power source such that a battery supplies the power to devices including the platform components. As a function of time, when one or more platform components are active, the battery charge may deplete and the voltage level may diminish as shown by the gradual drop in the level of battery voltage 402 in FIG. 4. FIG. 4 also illustrates a curve that represents the unfiltered system input voltage 404. This unfiltered system input voltage 404 is lower than the battery voltage, but also drops in parallel to the battery voltage 402. In addition, in the scenario of FIG. 4, the unfiltered system input voltage 404 exhibits a set of voltage spikes 406, which may develop in response to current spikes as discussed below with respect to FIG. 6. In particular, referring again to FIGS. 1 to 3, if a component such as processor 116, graphics processor 122, and/or memory 124 are operative to enter high power modes for brief periods or excursions, such modes may result in the (downward) voltage spikes 406. Such downward voltage spikes may occur for a duration that is approximately the same as the duration of the high power operation of platform components.

In the scenario of FIG. 4, for simplicity it is assumed that the power level for each high power (high current) excursion is about the same level and takes place for a similar duration as each other high power excursion. Accordingly, in each of the voltage spikes 406, the system input voltage reduces by about the same amount from the baseline level 410, and for similar duration. However, more generally, the duration of such current and voltage excursions may vary, and the power level during the excursions to high power mode of operation need not be the same for each excursion. Accordingly, the voltage spikes 406 in some cases may differ substantially from one another.

FIG. 4 also depicts the filtered system input voltage 408, which represents a filtered signal derived from the (unfiltered) system input voltage 404. Depending on the time constant of the filter and the duration of the voltage spikes 406, the filtered system input voltage may be characterized by a curve that is much smoother than that of the unfiltered system input voltage 404. As illustrated in FIG. 4, the filtered system input voltage 408 exhibits gradual undulations that have much smaller amplitude and longer duration than the voltage spikes 406.

FIG. 4 further illustrates two different voltage levels, $V_{REF1}$ and the level $V_{REF2}$ whose operation was discussed above. As noted, the level $V_{REF1}$ may be set in an undervoltage protection circuit to ensure that system input voltage does not drop to levels that may cause system shutdown or other adverse operation of the platform components 114. Thus, when the unfiltered system input voltage 408 drops below the level $V_{REF1}$ a control signal is automatically triggered that adjusts operation of platform components to bring the level of system input voltage 408 above $V_{REF1}$ In some examples, the level of $V_{REF1}$ may be about 5 to 6.5 V. The embodiments are not limited in this context. As shown in FIG. 4, at the time $T_1$ a downward voltage spike for the system input voltage 404 breaches the voltage level $V_{REF1}$.

As illustrated by the subsequent voltage curve features in FIG. 4, and explained in more detail below, an undervoltage protection circuit may generate a response to the voltage breach at time $T_1$ For example, an undervoltage protection component arranged according to the present embodiments, as shown in FIGS. 1 to 3 may respond to this voltage breach in such a manner that the system input voltage 404 rises rapidly above $V_{REF1}$ thereby ensuring that voltage supplied to platform components remains at safe operating levels. In particular, the voltage spike 412 includes an initial narrow spike portion 414 in which the voltage level briefly drops below the level $V_{REF1}$ and a longer duration spike portion 416 in which the voltage level is above $V_{REF1}$ but still below the baseline 410. The longer duration spike portion 416 corresponds to system operation in a high power mode in which the current level is lower than that corresponding to voltage spikes 406. During the narrow spike portion 414, while the unfiltered system input voltage 404 falls below the first reference voltage level $V_{REF1}$ the filtered system input voltage 408 remains above the second reference voltage level $V_{REF2}$. Because of this, the undervoltage protection component 110 is operative to trigger a control signal 214 to be sent to platform components 220.

One example of a control signal is illustrated in FIG. 5, which depicts the signal level 502 for a PROCHOT# signal as a function of time. At the time $T_1$, the PROCHOT signal pulse 504 is generated. Consistent with the present embodiments, the device 216 may be a monostable pulse generator ("one-shot") that generates a pulse having a duration of a few milliseconds to tens of milliseconds.

In response to receiving the PROCHOT# signal pulse 504, one or more components may lower operating current. For example, a processor core (CPU) may be operative to adjust current within a time frame in the range of one hundred microseconds to a few milliseconds after receiving the PROCHOT# signal pulse 504. FIG. 6 depicts an example of current operation for a platform component, such as a processor core. As illustrated, the current level 602 includes a series of current pulses 604 in which the current increases for a short duration and then decreases to a baseline level. Before the time $T_1$, the current pulses 604 cause the voltage spikes 406 as described above. At $T_1$, when the processor core or other element enters a high power mode, the current pulse 608 causes the voltage spike 412, which results in the generation of the PROCHOT# signal pulse 504. Because the platform component may adjust current levels rapidly, the level of the current is adjusted during the time of the current pulse 608, resulting in an initial narrow high current portion 610 and a longer lower current portion 612.

Subsequently, after system power level returns to a normal mode, any additional current excursions may be limited to a lower maximum current as shown for the current pulses 614. As a result, the subsequent voltage spikes 418 caused by the current pulses 614 are not as pronounced as the voltage spikes 406, and do not breach voltage level $V_{REF1}$.

One advantage of the arrangement whose operation is depicted in FIGS. 2 to 6 is that, in addition to providing undervoltage protection when a first voltage threshold is breached, the assertion of the control signal is prevented if the filtered baseline (or "slow") voltage that is characteristic of normal operating modes breaches a second voltage threshold. This prevents, among other things the unnecessary continuous assertion of a PROCHOT# signal that may adversely affect platform operation.

Figure 7:
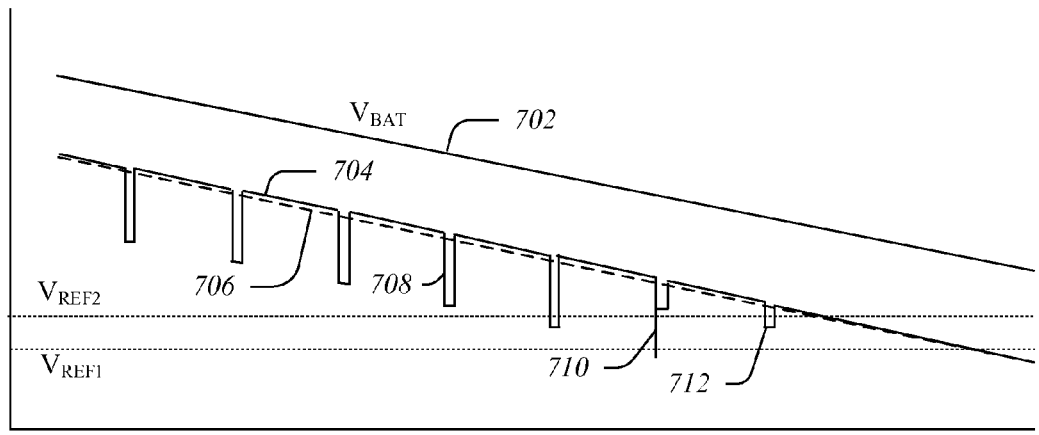
FIG. 7 details the behavior of various voltage signals in another exemplary scenario.
Figure 8:
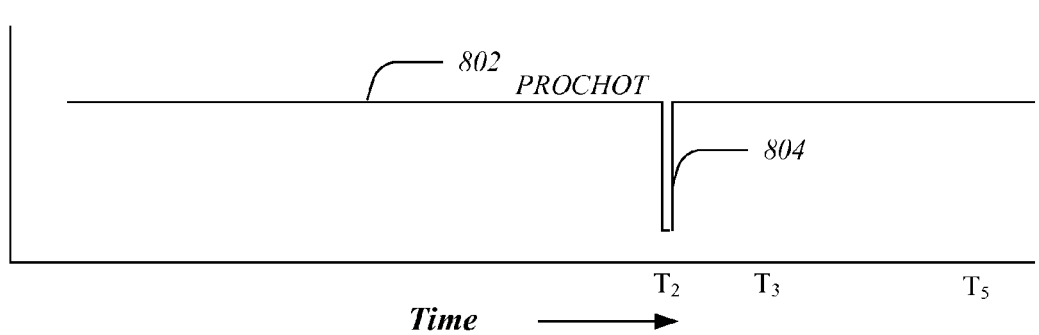
FIG. 8 illustrates the timing of a control signal that may result from the scenario of FIG. 7.
Figure 9:
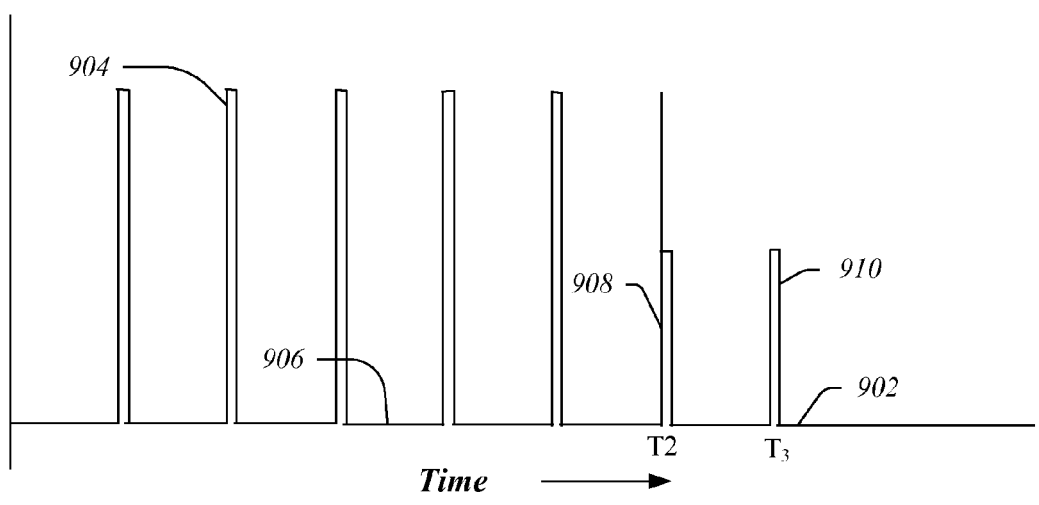
FIG. 9 illustrates an example of current operation for a platform component consistent with the scenario of FIGS. 7 and 8.

FIG. 7 depicts another scenario that further illustrates operation of the present embodiments. In the example of FIG. 7 there is shown a battery voltage 702 curve, as well as system input voltage curve 704 and filtered system input voltage 706. In this example, excursions by a platform component into a high power mode may cause the voltage spikes 708 of the unfiltered system input voltage curve 704. As shown in FIG. 7, at time $T_2$, the filtered system input voltage 706 is above the second reference voltage level $V_{REF2}$. At the same time, a voltage spike 710 breaches the voltage level $V_{REF1}$ such that the undervoltage protection component 110 may assert a PROCHOT# signal. FIG. 8 illustrates the timing of a PROCHOT# signal 802 showing the generation of a pulse 804 at the time $T_2$. As with the example of FIGS. 4 to 6, this pulse 804 may trigger the platform component to reduce current. FIG. 9 illustrates an example of current for a component such as a processor core. As discussed above, the current level 902 may be characterized by a series of peaks 904 during which the current is increased, such as when the processor core enters a high power mode. After each peak the current may return to a baseline level 906. As a result of the current behavior shown in FIG. 9, the system input voltage may behave as illustrated in FIG. 7, for example when operating entirely on battery power. As discussed above, at time $T_2$ the current peak 908 may cause the system input voltage to spike downwardly and breach the reference voltage level VREF1, thereby triggering the PROCHOT# pulse 804. In response, the processor core may rapidly adjust current levels downwardly so that current in the high power operation is lower even within the current peak 908. Accordingly, in a subsequent high current operation, the current peak 910 is lower than that of the current peaks 904 before the assertion of the PROCHOT# pulse 804. The current levels may be adjusted to initial values when the AC adapter is re-connected and/or the battery charge level is raised.

As further shown in FIG. 7, at time $T_3$ when the processor enters a subsequent elevated power state, the maximum current is limited to a lower level than before assertion of the PROCHOT# pulse 804, such that the lower level of the current peak 910 results in a smaller voltage spike 712. At the instance shown at $T_3$ this smaller downward voltage spike is not sufficient to breach the reference voltage level $V_{REF1}$. Accordingly, no PROCHOT# signal is asserted at $T_3$.

As further shown in FIG. 8, at the subsequent time $T_4$ the system input voltage 704 crosses below the reference voltage level $V_{REF1}$. In accordance with the embodiments of an undervoltage protection circuit discussed above with respect to FIGS. 2 and 3, the assertion of PROCHOT# by the undervoltage protection circuit may be automatically disabled. In addition, the high current operating mode for the components in question that generated the current peaks 708 to 712 may be disabled. Thus, no subsequent current peaks characteristic of high power operation are observed after current peak 910, and even when the system input voltage 704 falls below the reference voltage $V_{REF1}$ at time $T_5$ the PROCHOT# signal is not asserted.

In further embodiments of an undervoltage protection circuit, the second reference voltage circuit, such as circuit 210 or 304 need not be included. In such arrangements, when the system input voltage initially breaches the reference voltage level $V_{REF1}$, a PROCHOT# signal may be asserted to instruct components to reduce operating power. When the breach of the reference voltage level $V_{REF1}$ is caused by a spike in processor current when the processor enters a turbo operation mode, for example, this reduction in current may be effective in reducing the (downward) voltage spike so that system input voltage levels return to safe levels, such as values above the $V_{REF1}$ as shown in FIGS. 4 and 7. However, additional circuitry or logic may be needed to ensure that PROCHOT# is not continuously asserted, for example, if platform components continue to run on battery power and when the baseline voltage subsequently reduces below $V_{REF1}$, which continuous assertion may otherwise cause unwanted and adverse system behavior.

As noted previously, in order to respond to a potential undervoltage condition in various embodiments a control signal may be provided to platform components over a conventional input such as PROCHOT# pin. In conventional operation where the PROCHOT# pin is used to conduct signals to control platform component operation due to a thermal condition, such as a detected breach of a temperature limit in one or more platform components, the response engendered in platform components may be very different than the response to an undervoltage condition as described above.

Accordingly, in various embodiments, the platform device power management component 112 shown in FIG. 1 may determine the nature of an event that triggers PROCHOT#, in order that the appropriate adjustments are made to platform component operation. As noted, the platform device power management component 112 may be embodied in any combination of hardware and/or software. In some embodiments, the platform device power management component 112 takes advantage of the different duration that may characterize a system undervoltage condition as opposed to a thermal breach. In conventional operation, when a thermal breach occurs that causes a sensor to detect that a platform component has exceeded a temperature limit, the assertion of PROCHOT# causes one or more components, such as a processor core, graphics core to throttle operation so that less power is consumed to allow the platform component(s) time to cool to a temperature at which normal platform component operation may resume. The thermal time constant for such components is such that the duration of the thermal breach may typically last for tenths of seconds, seconds, or even tens of seconds before the platform component(s) cools to acceptable level. During this time a PROCHOT# signal may be asserted resulting in an assertion of the PROCHOT# signal for duration as long as seconds or more. In contrast, a system undervoltage condition caused by a current excursion such as when a platform component enters turbo operation, may last only for microseconds, milliseconds or tens of milliseconds. Accordingly, PROCHOT# assertion for the undervoltage condition may span a short duration such as five, ten or twenty milliseconds. Thus, by monitoring the duration of PROCHOT# assertion, the platform device power management component 112 may more accurately ascertain the nature of the event giving rise to the PROCHOT# assertion and thereby determine appropriate action to launch.

In additional embodiments, the platform protection system 108 may generate a platform control signal that is not a PROCHOT# signal. In such embodiments, a special algorithm and separate signal pin may be used to conduct the platform component control signal to control power in a processor or other platform component.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 10:
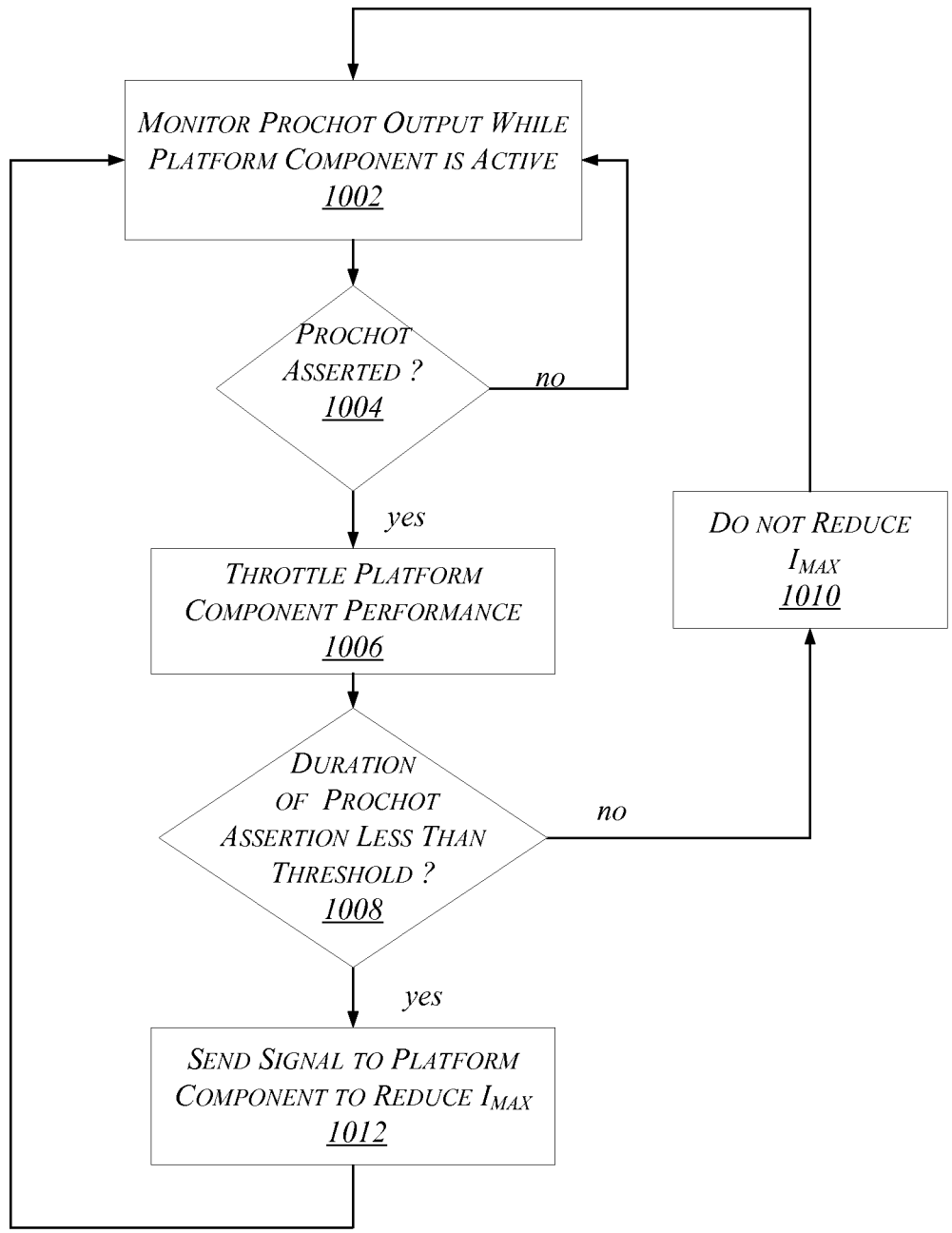
FIG. 10 illustrates an exemplary first logic flow.

FIG. 10 depicts an exemplary first logic flow 1000. The logic flow 1000 may be implemented, for example, by a platform device power management component. At block 1002 the output of PROCHOT# signal is monitored. For example, the output through a PROCHOT# pin may be monitored periodically or continuously. At block 1004 a determination is made if the PROCHOT# signal has been asserted. If not, the flow returns to block 1002. If so, the flow proceeds to block 1006.

At block 1006, the performance of a system component is throttled. For example, a signal may be forwarded to a CPU, graphics processor, memory or other device to reduce frequency or take other action to reduce current consumption. The flow then proceeds to block 1008.

At block 1008 a determination is made as to whether the duration of the monitored PROCHOT# signal is less than a threshold value. In some examples, this threshold value may range between five and fifty milliseconds. If, at block 1008, the PROCHOT# signal duration is not less than the threshold, a determination is made that the PROCHOT# signal actually represents a thermal breach in which a platform component is overheated. The logic flow then moves to block 1010.

At block 1010, because it was decided that the currently asserted PROCHOT# signal represents a thermal breach, a determination is made to not adjust the maximum current ($I_{MAX}$) of the affected platform component(s) downwardly. In this manner when the thermal breach ends, the operation of the affected platform component(s) may be restored to normal operation.

If, at block 1008 a determination is made that the PROCHOT# signal duration is less than the threshold, the logic flow moves to block 1012. At the block 1012, a signal is sent to the affected platform component to reduce the maximum operating current. In this manner, even while in a high power mode, the platform component may be limited to a maximum power that causes less voltage droop so that a safe operating voltage is less likely to be breached.

Figure 11:
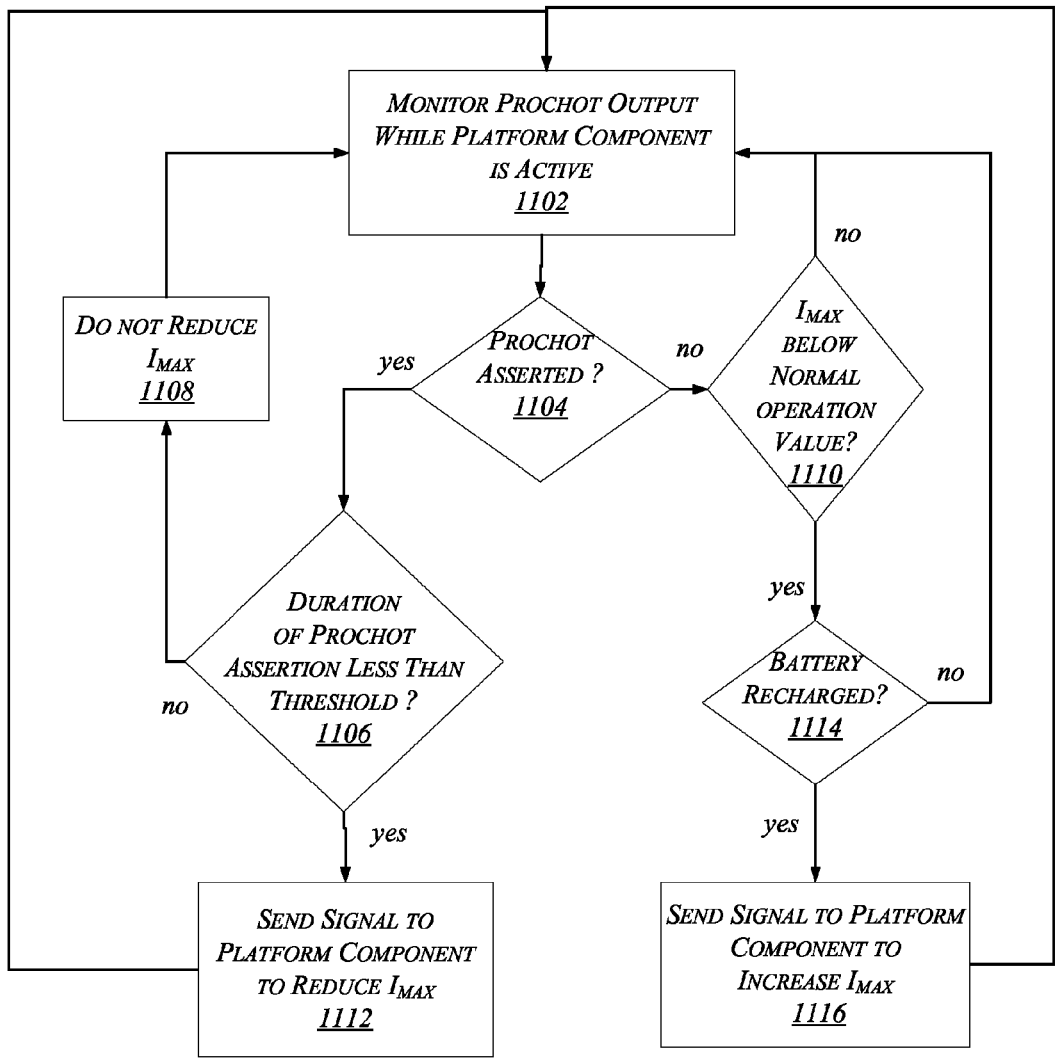
FIG. 11 illustrates an exemplary second logic flow.

FIG. 11 depicts an exemplary second logic flow 1100. The logic flow 1100 may be implemented, for example, by a platform device power management component. At block 1102, the output of a PROCHOT# signal is monitored while a platform component is active.

At block 1104, a determination is made as to whether the PROCHOT# signal has been asserted. If so, the flow moves to decision block 1106 where a determination is made as to whether the duration of the PROCHOT# assertion is less than a threshold value. If not, the flow moves to block 1108, at which block the maximum current for the platform component is not adjusted downwardly. The flow then returns to block 1102.

If, at block 1106, the PROCHOT# assertion duration is less than the threshold, the flow moves to block 1112, where a signal is sent to reduce the maximum current for the platform component.

If, at block 1104, the PROCHOT# signal is not currently asserted, the flow moves to block 1110. At the decision block 1110, a determination is made as to whether the maximum current ($I_{MAX}$) of the platform component is currently set at a value below the maximum current for normal operation of the platform component. For example, the value of $I_{MAX}$ may be set in a register and may be lowered when PROCHOT# is asserted so that no matter what power mode of operation the current may not exceed the value of $I_{MAX}$ set in the register. If not, the flow moves back to block 1102, where monitoring is conducted for PROCHOT# assertion.

If, at block 1110, the current value of $I_{MAX}$ is set below that for normal operation of the platform component, the flow moves to block 1114, where a determination is made as to whether the battery for powering the platform component has been recharged beyond a threshold value. If not, the flow returns to block 1102. If the battery has been recharged, the flow proceeds to block 1116.

At block 1116, a signal is sent to the platform component to increase the value of $I_{MAX}$ to restore the maximum current to that of normal operation levels.

Figure 12:
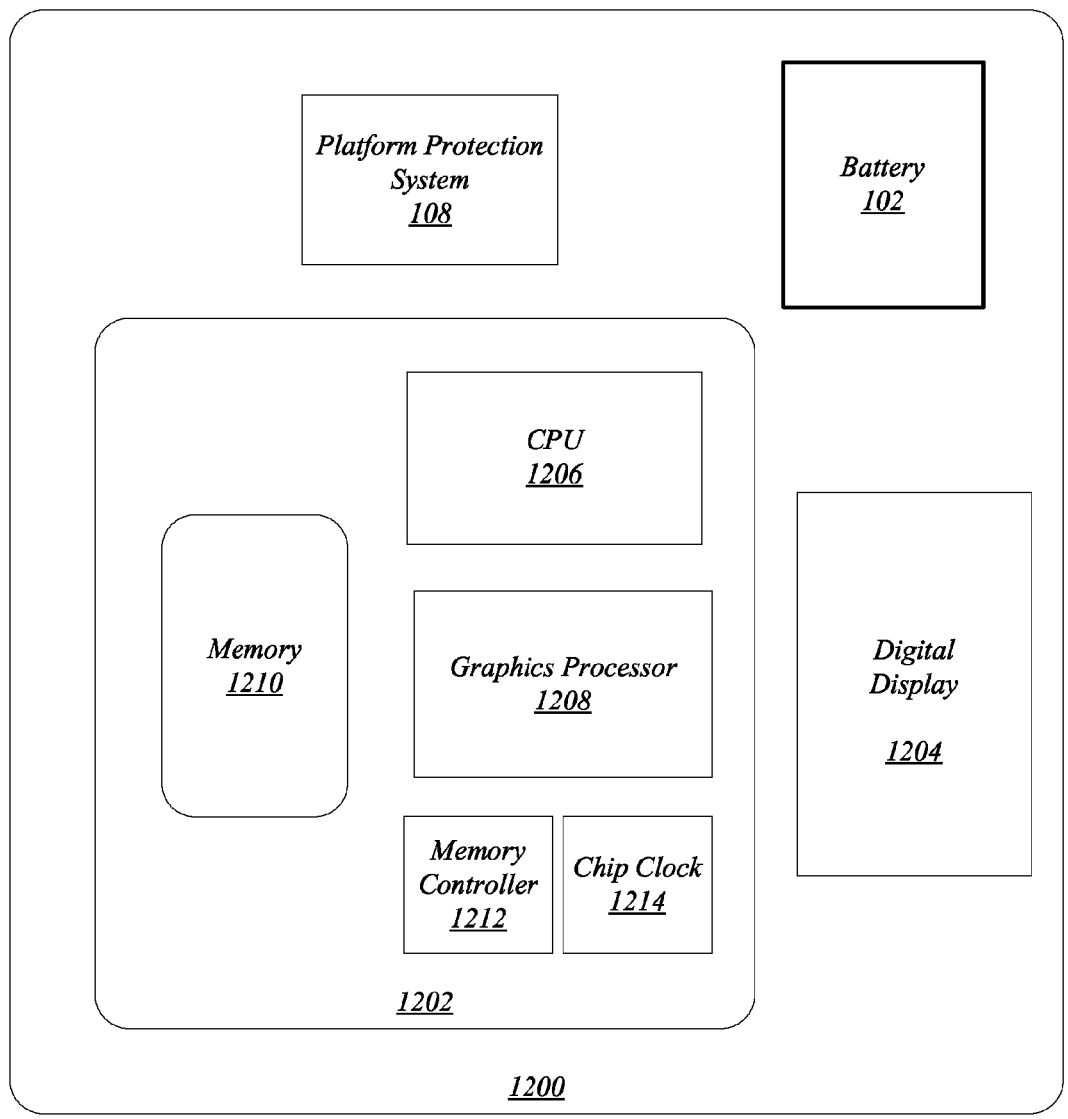
FIG. 12 depicts components of one system embodiment.

FIG. 12 depicts one embodiment of a system 1200, which may include the platform protection system 108, battery 102 and various other elements. The system 1200 may be implemented in various devices including cellular telephones, tablet computing devices, smartphones, set-top devices, notebook computers, electronic games, and other devices. The embodiments are not limited in this contest. The system 1200 may include a system-on-a-chip (SoC) 1202 and digital display 1204. As further shown in FIG. 12, the SoC 1202 includes, in addition to a CPU 1206 and graphics processor 1208, a memory 1210, memory controller 1212 and chip clock 1214.

Figure 13:
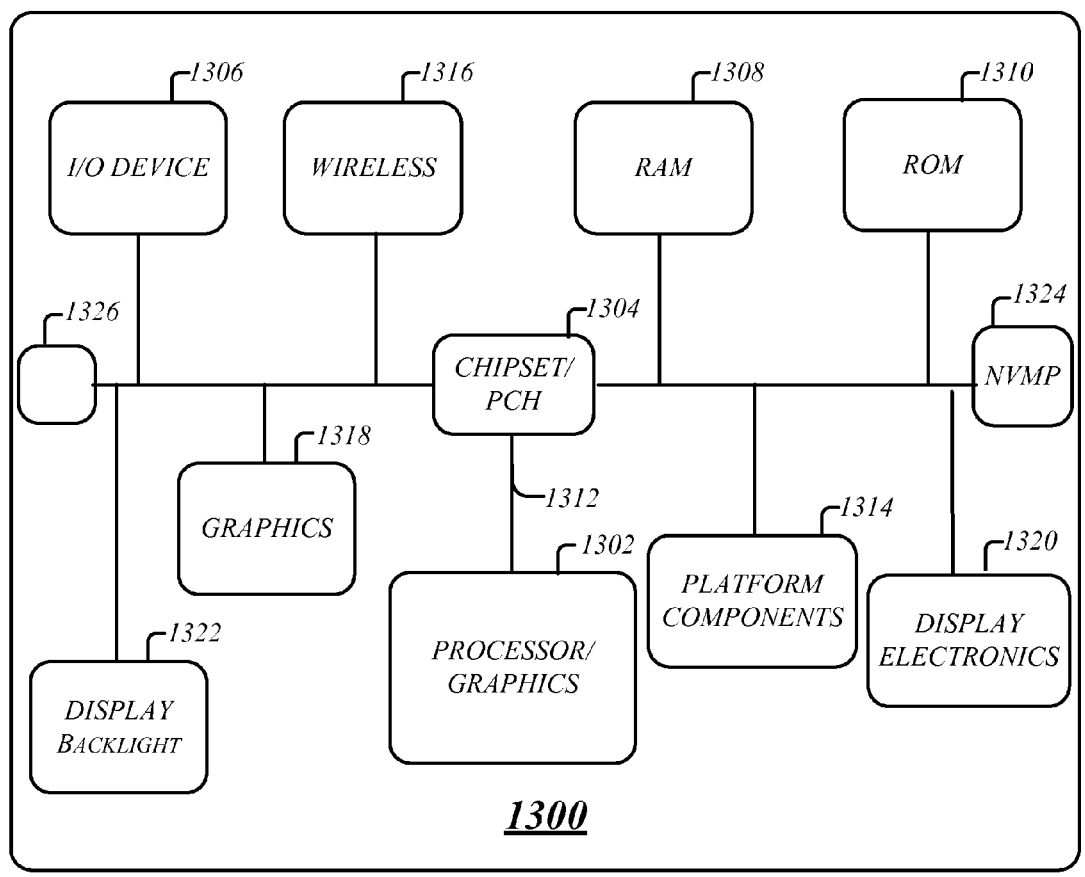
FIG. 13 is a diagram of an exemplary system embodiment.

FIG. 13 is a diagram of an exemplary system embodiment and in particular, FIG. 13 is a diagram showing a platform 1300, which may include various elements. For instance, FIG. 13 shows that platform (system) 1310 may include a processor/graphics core 1302, a chipset/platform control hub (PCH) 1304, an input/output (I/O) device 1306, a random access memory (RAM) (such as dynamic RAM (DRAM)) 1308, and a read only memory (ROM) 1310, display electronics 1320, display backlight 1322, and various other platform components 1314 (e.g., a fan, a crossflow blower, a heat sink, DTM system, cooling system, housing, vents, and so forth). System 1300 may also include wireless communications chip 1316 and graphics device 1318. The embodiments, however, are not limited to these elements.

As shown in FIG. 13, I/O device 1306, RAM 1308, and ROM 1310 are coupled to processor 1302 by way of chipset 1304. Chipset 1304 may be coupled to processor 1302 by a bus 1312. Accordingly, bus 1312 may include multiple lines.

Processor 1302 may be a central processing unit comprising one or more processor cores and may include any number of processors having any number of processor cores. The processor 1302 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1302 may be multiple separate processors located on separate integrated circuit chips. In some embodiments processor 1302 may be a processor having integrated graphics, while in other embodiments processor 1302 may be a graphics core or cores.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In one embodiment, an apparatus includes first circuitry coupled to one or more platform components, where the first circuitry is operative to receive an unfiltered input voltage signal, to compare a first voltage level of the unfiltered input voltage signal to a first reference voltage level, and to generate a control signal operative to lower operation power of one or more of the one or more platform components when the first voltage level is less than the first reference voltage level.

In another embodiment, the apparatus may include second circuitry operative to filter the input voltage signal, to compare a second voltage level of the filtered input voltage signal to a second reference voltage level that is less than the first reference voltage level, and to disable the control signal when the second voltage level is below a second reference voltage.

Alternatively, or in addition, in a further embodiment, the control signal may comprise a PROCHOT# signal that is operative to signal one of: excessive component heat of one or more platform components and system input voltage breach of a voltage threshold.

Alternatively, or in addition, in a further embodiment, the apparatus may comprise a platform device power management component operative to detect assertion of a PROCHOT# signal, and to generate a signal to lower maximum operating current in a platform component when a duration of assertion of the PROCHOT# signal is below a threshold time.

Alternatively, or in addition, in a further embodiment, the first voltage comparator may have a first input to receive the unfiltered input voltage and a second input to receive the first reference voltage; and the second circuitry may comprise a second voltage comparator having a first input arranged to receive the filtered input voltage and a second input arranged to receive a second reference voltage.

Alternatively, or in addition, in a further embodiment, first circuitry may comprise a first field effect transistor having a source coupled to an output of a first comparator.

Alternatively, or in addition, in a further embodiment, the apparatus second circuitry may comprise a second field effect transistor having a gate coupled to the output of a first comparator of the first circuit and drain coupled to the first circuitry.

Alternatively, or in addition, in a further embodiment, the platform device power management component may be operative to generate a signal to reduce performance when the PROCHOT# signal is asserted.

Alternatively, or in addition, in a further embodiment, the platform device power management component may be operative to increase maximum operating current of the platform component when maximum operating current is currently in a lowered state, the PROCHOT# signal is not asserted, and a battery level is above a predetermined threshold.

Alternatively, or in addition, in a further embodiment, the apparatus may comprise a battery operative to generate the input voltage signal.

In a further embodiment, a computer implemented method may include receiving an unfiltered input voltage signal, comparing a first voltage level of the unfiltered input voltage signal to a first reference voltage level, and generating a control signal to lower operation power of one or more platform components when the first voltage level is below the first reference voltage level.

In a further embodiment, the computer implemented method may include filtering the input voltage signal, comparing a second voltage level of the filtered input voltage signal to a second reference voltage level that is less than the first reference voltage level, and disabling the control signal when the second voltage level is below a second reference voltage that is higher than the first reference voltage.

Alternatively, or in addition, in a further embodiment, the control signal may comprise a PROCHOT# signal that is operative to signal one of: excessive component heat of one or more platform components and system input voltage breach of a voltage threshold.

Alternatively, or in addition, in a further embodiment, the computer implemented method may comprise detecting assertion of a PROCHOT# signal, and generating a signal to lower maximum operating current in a platform component when a duration of assertion of the PROCHOT# signal is below a threshold time.

Alternatively, or in addition, in a further embodiment, the computer implemented method may comprise generating a signal to reduce performance when the PROCHOT# signal is asserted.

Alternatively, or in addition, in a further embodiment, the computer implemented method may comprise increasing maximum operating current of the processor circuit when maximum operating current is currently in a lowered state, the PROCHOT# signal is not asserted, and a battery level is above a predetermined threshold.

In a further embodiment, an apparatus may be configured to perform the method of any one of the preceding embodiments.

In another embodiment, at least one machine readable medium may comprise a plurality of instructions that in response to being executed on a computing device, cause the computing device to carry out a method according to any one of the preceding embodiments.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments

The invention claimed is:

1. An apparatus, comprising:
first circuitry coupled to one or more platform components, the first circuitry operative to:
  receive an unfiltered input voltage signal;
  compare a first voltage level of the unfiltered input voltage signal to a first reference voltage level; and
  generate a control signal operative to lower operation power of one or more of the one or more platform components when the first voltage level is less than the first reference voltage level; and
second circuitry coupled to one or more platform components, the second circuitry operative to:
  filter the input voltage signal;
  compare a second voltage level of the filtered input voltage signal to a second reference voltage level that is less than the first voltage level; and
  disable the control signal when the second voltage level is below a second reference voltage.

2. The apparatus of claim 1, the control signal comprising a PROCHOT# signal that is operative to signal one of: excessive component heat of one or more platform components and system input voltage breach of a voltage threshold.

3. The apparatus of claim 1, comprising a platform device power management component operative to:

detect assertion of a PROCHOT# signal; and
generate a signal to lower maximum operating current in a platform component when a duration of assertion of the PROCHOT# signal is below a threshold time.

4. The apparatus of claim 1, the first circuitry comprising:
a first voltage comparator having a first input to receive the unfiltered input voltage and a second input to receive the first reference voltage; and
the second circuitry comprising a second voltage comparator having a first input arranged to receive the filtered input voltage and a second input arranged to receive a second reference voltage.

5. The apparatus of claim 1, the first circuitry comprising:
a first field effect transistor having a source coupled to an output of a first comparator.

6. The apparatus of claim 1, the second circuitry comprising a second field effect transistor having a gate coupled to an output of a first comparator of the first circuit and a drain coupled to the first circuitry.

7. The apparatus of claim 3, the platform device power management component operative to generate a signal to reduce performance when the PROCHOT# signal is asserted.

8. The apparatus of claim 3, the platform device power management component operative to increase maximum operating current of the platform component when maximum operating current is currently in a lowered state, the PROCHOT# signal is not asserted, and a battery level is above a predetermined threshold.

9. The apparatus of claim 1, comprising a battery operative to generate the input voltage signal.

10. A method, comprising:
receiving an unfiltered input voltage signal;
comparing a first voltage level of the unfiltered input voltage signal to a first reference voltage level; and
generating a control signal to lower operation power of one or more platform components when the first voltage level is below the first reference voltage level;
filtering the input voltage signal;
comparing a second voltage level of the filtered input voltage signal to a second reference voltage level that is less than the first reference voltage level; and
disabling the control signal when the second voltage level is below a second reference voltage.

11. The method of claim 10, the control signal comprising a PROCHOT# signal that is operative to signal one of: excessive component heat of one or more platform components and system input voltage breach of a voltage threshold.

12. The method of claim 10, comprising:
detecting assertion of a PROCHOT# signal; and
generating a signal to lower maximum operating current in a platform component when a duration of assertion of the PROCHOT# signal is below a threshold time.

13. The method of claim 12, comprising generating a signal to reduce performance when the PROCHOT# signal is asserted.

14. The method of claim 12, comprising increasing maximum operating current of the platform component when maximum operating current is currently in a lowered state, the PROCHOT# signal is not asserted, and a battery level is above a predetermined threshold.

15. An apparatus, comprising:
first circuitry coupled to one or more platform components, the first circuitry operative to:
receive an unfiltered input voltage signal;
compare a first voltage level of the unfiltered input voltage signal to a first reference voltage level; and
assert a PROCHOT# signal operative to lower operation power of one or more of the one or more platform components when the first voltage level is less than the first reference voltage level; and
second circuitry coupled to one or more platform components, the second circuitry operative to:
filter the input voltage signal;
compare a second voltage level of the filtered input voltage signal to a second reference voltage level that is less than the first reference voltage level; and
disable the PROCHOT# signal when the second voltage level is below a second reference voltage.

16. The apparatus of claim 15, the PROCHOT# signal being operative to signal one of: excessive component heat of one or more platform components and system input voltage breach of a voltage threshold.

17. The apparatus of claim 15, comprising a platform device power management component operative to:
detect assertion of the PROCHOT# signal; and
generate a signal to lower maximum operating current in a platform component when a duration of assertion of the PROCHOT# signal is below a threshold time.

18. The apparatus of claim 17, the platform device power management component operative to increase maximum operating current of the platform component when maximum operating current is currently in a lowered state, the PROCHOT# signal is not asserted, and a battery level is above a predetermined threshold.

19. At least one non-transitory computer-readable storage medium comprising a plurality of instructions that, when executed, cause a system to:
receive an unfiltered input voltage signal;
compare a first voltage level of the unfiltered input voltage signal to a first reference voltage level;
generate a control signal to lower operation power of one or more platform components when the first voltage level is below the first reference voltage level;
filter the input voltage signal;
compare a second voltage level of the filtered input voltage signal to a second reference voltage level that is less than the first reference voltage level; and
disable the control signal when the second voltage level is below a second reference voltage.

20. The at least one non-transitory computer-readable storage medium of claim 19, the control signal comprising a PROCHOT# signal that is operative to signal one of: excessive component heat of one or more platform components and system input voltage breach of a voltage threshold.

21. The at least one non-transitory computer-readable storage medium of claim 19 comprising instructions that, when executed, cause a system to:
detect assertion of a PROCHOT# signal; and
generate a signal to lower maximum operating current in a platform component when a duration of assertion of the PROCHOT# signal is below a threshold time.

22. The at least one non-transitory computer-readable storage medium of claim 21 comprising instructions that, when executed, cause a system to reduce performance when the PROCHOT# signal is asserted.

23. The at least one non-transitory computer-readable storage medium of claim 21 comprising instructions that, when executed, cause a system to increase maximum operating current of the platform component when maximum operating current is currently in a lowered state, the PROCHOT# signal is not asserted, and a battery level is above a predetermined threshold.

* * * * *